United States Patent
> Flipot

[15] 3,692,887

[45] Sept. 19, 1972

[54] CONTROLLED CALCINATION OF AGGLOMERATED NUCLEAR FUEL PRIOR TO PELLETIZING AND SINTERING

[72] Inventor: Alfred J. P. Flipot, Geel, Belgium
[73] Assignee: Belgonucleaire S.A., Bruxelles, Belgium
[22] Filed: Dec. 23, 1968
[21] Appl. No.: 786,434

[30] Foreign Application Priority Data

Dec. 21, 1967 Belgium..................52.429
Sept. 12, 1968 Belgium..................63.310

[52] U.S. Cl. ...............264/0.5, 264/65, 264/66
[51] Int. Cl.....................G21c 3/62, C04b 35/64
[58] Field of Search................264/0.5, 65, 66

[56] References Cited

UNITED STATES PATENTS 3,258,317  6/1966  Brearton..................264/65
3,504,058  3/1970  Masselot..................264/0.5

OTHER PUBLICATIONS

Numerous articles regarding Production of Nuclear Fuel appearing in the December, 1970 issue of Ceramic Age at pages 13–34

Primary Examiner—Julius Frome
Assistant Examiner—John H. Miller
Attorney—William D. Hall, Elliott I. Pollock, Fred C. Philpitt, George Vande Sande, Charles F. Steininger and Robert R. Priddy

[57] ABSTRACT

Manufacturing method for sintered nuclear reactor fuel pellets exhibiting improved density reproducibility in which the fabrication procedure includes thermal deactivation at 600° to 1,000° C. for a controlled time of the fuel after an initial agglomeration step but prior to pelletizing, followed by an optional addition of a pressing lubricant, pelletizing, and sintering to about 1,600° C or above. The thermal deactivation step reduces the amount of shrinkage encountered in the sintering step as compared with conventional techniques resulting in good dimensional characteristics and density uniformity.

3 Claims, No Drawings

CONTROLLED CALCINATION OF AGGLOMERATED NUCLEAR FUEL PRIOR TO PELLETIZING AND SINTERING

BACKGROUND OF THE INVENTION

Sintered fuel pellets for nuclear reactors are usually manufactured from ceramic powder, such as for instance oxides, carbides or nitrides of uranium, plutonium or other transuranium elements. One of the manufacturing problems is that of achieving constant density reproducibility in pellets whose density may vary from 70 to 98 percent of the theoretical density, even when using ceramic powders with identical characteristics.

In presently known pellet manufacturing processes, the powder is agglomerated (possibly after addition of a binder), granulated, pelletized and sintered. In such processes, pellets of predetermined higher and lower densities within the above-mentioned density limits can be produced from the same kind of powder either by adding increased quantities of binder before or after granulation, or by pretreating the powder in such a manner that it does not sinter to the usual extent in the sintering process. However, addition of large amounts of binder entails such disadvantages as: lack of density reproducibility due to the difficulty of obtaining a homogeneous dispersion of the binder in the powder; the necessity of having to use water which, in view of its moderating characteristic, restricts drastically the amount of fissile material which may be processed within a given volume enclosure; or sintering oven fouling; and the like. On the other hand, preliminary treatment of powder involves subjecting them to high temperatures which increase the abrasiveness of the powders and the cost of the manufacturing process.

The object of the present invention is a nuclear reactor fuel pellet manufacturing method making it possible to avoid the known process disadvantages while nevertheless yielding pellets of a desired density in a reproducible manner.

BRIEF SUMMARY OF THE INVENTION

The present invention is a method for fabrication of nuclear fuel pellets from ceramic powder comprising the following steps: agglomeration, granulation, pelletizing and sintering, characterized by deactivation by a thermal treatment carried out after agglomeration and before pelletizing. This deactivation step may therefore be carried out before or after granulation. As a matter of fact, automatic pelletizing presses usually require a granule feed which flows smoothly in order to achieve constant quality manufacture, and better results are then achieved when deactivating is conducted after granulation. There are, nevertheless, pelletizing presses which may be fed with ground material whose granuometric spectrum is large and therefore permit deactivating the powder before granulating it.

The extent of deactivation treatment of the agglomerates or granules is a function of the final density required and may be controlled by several means such as temperature, duration and the atmosphere in which the treatment takes place. Temperatures between 600° and 1,000° C. are preferred. Temperatures below 600° C. are practically without any effect. Those above 1,000° C. must be avoided as they yield a product which is too hard to pelletize. Treatment duration, in the range of a few hours, is selected according to the temperature. A $CO_2$ atmosphere is preferred, since it has been noticed that it yields a softer product when compared with other atmospheres such as, for instance, vacuum, hydrogen, argon or a hydrogen-argon mixture, which nevertheless may be satisfactorily used.

EXAMPLES

Embodiments of nuclear fuel pellet manufacturing methods according to the invention are described hereinafter by means of examples which are in no way intended to limit the invention.

EXAMPLE 1

Uranium dioxide powder is agglomerated at 3,000 kg/cm². The resulting agglomerate is ground to pass through a 0.3 mm sieve. These granules are then maintained at 900° for 5 hours in a $CO_2$ atmosphere. After this deactivation treatment, 0.5 percent by weight of a dry zinc behenate based lubricant is added. The granules are then cold formed in a mechanical press. The deactivation step permits easy manufacture of pellets in which a green (before sintering) density of 7.2 g/cm³ is attained, whereas the original powder cannot be pelletized to a density of more than 6 g/cm³ without giving rise to end-cracking or even to rupture of the pellets upon ejection by the press. After sintering for 1 hour at 1,600° C. in an atmosphere of 95 percent argon and 5 percent hydrogen, the pellet density is 9.6 g/cm³, or about 87.5 percent of the theoretical density. As the shrinkage is very small, the dimensional characteristics of the pellets are very good.

EXAMPLE 2

Uranium dioxide powder is agglomerated at 3,000 kg/cm². The agglomerate is maintained at 900° C. for 5 hours in a $CO_2$ atmosphere. After this deactivation treatment, the agglomerate is ground up in a hammer mill, and is then mixed with 0.5 percent by weight of a zinc behenate based dry lubricant. The ground product is then cold formed in a mechanical press. The resulting pellets are sintered by heating for 1 hour at 1,600° C. in a 95 percent argon and 5 percent hydrogen atmosphere. The pellets manufactured in this manner have the same characteristics as those resulting from the process described in Example 1.

EXAMPLE 3

Uranium dioxide powder is mixed with 0.5 percent of polyethylene glycol and 0.5 percent of polyvinyl alcohol in aqueous solution. The resulting paste is dried in air at 110° C. and the dry cake is ground to granules which will pass through a 0.4 mm sieve. These granules are then deactivated by maintaining them for 3 hours at 1,000° C. in a flow of argon mixed with 5 percent hydrogen. After adding 0.2 percent of a zinc stearate based dry lubricant, the granulates are cold pelletized in a hydraulic press at 4,000 kg/cm² to obtain 19 mm pellets. These are then sintered at 1,650° C. for 1 hour in a commercial hydrogen atmosphere. These sintered pellets have a 9.6 g/cm³ density, which is about 87.5 percent of the theoretical density. In comparison, pellets manufactured in the same way but without deactivation would have a 10.6 g/cm³ density, or about 96.7 percent of the theoretical density.

These three examples show that the method can be used equally well in dry or wet pellet manufacturing processes. While it is generally preferable to reduce the amount of binder or lubricant to a minimum, these do not limit the scope of the process, that is the deactivation effect. Anyhow, these additives are completely or partly removed in the deactivation step. From the foregoing, it can be seen that the method of the present invention has various advantages. The process permits manufacture of pellets of any density from only one kind of powder; it therefore permits using a powder which can be easily produced industrially. The process avoids the use of binders and thereby avoids their drawbacks such as fouling up of the oven, the use of water, and so forth. The deactivated granules flow better than non deactivated ones, thus giving better pellet reproducibility.

What is claimed is:

1. A method of preparing nuclear fuel pellets with reproducible density from sinterable particles of a nuclear fuel powder of oxides, carbides and nitrides of uranium, plutonium and other transuranium elements in a particle size suitable for conversion to nuclear fuel pellets, said method comprising: forming said sinterable particles into agglomerates of a size greater than 0.3 mm., grinding said agglomerates of sinterable particles to granules of a size which will feed smoothly in an automatic pelletizing press, deactivating said particles subsequent to agglomeration and prior to pelletizing at a temperature in the range of 600 to 1000° C, controlling the time and temperature of said deactivation to avoid production of particles which are too hard to pelletize by mechanical compression, pelletizing in a mechanical press a mixture consisting essentially of the product of the foregoing deactivation step and up to 0.5 percent by weight of lubricant, and sintering the resultant pellets in a hydrogen atmosphere.

2. A method in accordance with claim 1 wherein the step of deactivating said particles is performed subsequent to said grinding step.

3. A method in accordance with claim 1 wherein said step of deactivating said particles is carried out in a $CO_2$ atmosphere.

* * * * *